(12) United States Patent
Wang et al.

(10) Patent No.: US 11,877,057 B2
(45) Date of Patent: Jan. 16, 2024

(54) ELECTRONIC DEVICE AND FOCUSING METHOD

(71) Applicant: VIVO MOBILE COMMUNICATION CO., LTD., Dongguan (CN)

(72) Inventors: Qiaoming Wang, Dongguan (CN); Xiaodong Cui, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/751,642

(22) Filed: May 23, 2022

(65) Prior Publication Data

US 2022/0286618 A1 Sep. 8, 2022

Related U.S. Application Data

(63) Continuation of application No. PCT/CN2020/131160, filed on Nov. 24, 2020.

(30) Foreign Application Priority Data

Nov. 28, 2019 (CN) .......................... 201911195293.2

(51) Int. Cl.
H04N 23/67 (2023.01)
(52) U.S. Cl.
CPC ................................ *H04N 23/672* (2023.01)
(58) Field of Classification Search
CPC .. H04N 23/672; H04N 23/67; H04N 23/6812; H04N 23/45
See application file for complete search history.

(56) References Cited

U.S. PATENT DOCUMENTS

| 2016/0065833 | A1 | 3/2016 | Chen et al. |
| 2017/0212327 | A1 | 7/2017 | Lee et al. |
| 2019/0297291 | A1 | 9/2019 | Kim et al. |

FOREIGN PATENT DOCUMENTS

| CN | 102801929 A | 11/2012 |
| CN | 105376474 A | 3/2016 |
| CN | 106027905 A | 10/2016 |
| CN | 106030366 A | 10/2016 |
| CN | 106331484 A | 1/2017 |
| CN | 106534696 A | 3/2017 |
| CN | 106603911 A | 4/2017 |
| CN | 107040724 A | 8/2017 |

(Continued)

OTHER PUBLICATIONS

English translation of, CN 105376474 A (Year: 2016).*

(Continued)

*Primary Examiner* — Shahbaz Nazrul
(74) *Attorney, Agent, or Firm* — IPX PLLC

(57) ABSTRACT

An electronic device and a focusing method are provided. The electronic device includes at least two cameras, and each of the at least two cameras is provided with a phase difference (PD) point pair set having one or more PD point pairs. The one or more PD point pairs in the PD point pair set of one camera are located in different areas of the one camera, and areas of another camera corresponding to the different areas where the one or more PD point pairs of the one camera are located do not have PD point pairs located therein, and the another camera is a camera other than the one camera in the at least two cameras.

10 Claims, 4 Drawing Sheets

(56) References Cited

FOREIGN PATENT DOCUMENTS

| | | |
|---|---|---|
| CN | 107465881 A | 12/2017 |
| CN | 108206914 A | 6/2018 |
| CN | 108965666 A | 12/2018 |
| CN | 109788199 A | 5/2019 |
| CN | 109937382 A | 6/2019 |
| CN | 109981965 A | 7/2019 |
| CN | 110933305 A | 3/2020 |
| JP | 2019087880 A | 6/2019 |

OTHER PUBLICATIONS

Extended European Search Report issued in related European Application No. 20893348.1, dated Nov. 23, 2022, 11 pages.
International Search Report issued in corresponding International Application No. PCT/CN2020/131160, dated Feb. 18, 2021, 4 pages.
First Office Action issued in related Chinese Application No. 201911195293.2, dated Nov. 27, 2020, 10 pages.

* cited by examiner

ELECTRONIC DEVICE AND FOCUSING METHOD

CROSS-REFERENCE TO RELATED APPLICATIONS

This application is a continuation of International Application No. PCT/CN2020/131160, filed Nov. 24, 2020, which claims priority to Chinese Patent Application No. 201911195293.2, filed Nov. 28, 2019. The entire contents of each of the above-referenced applications are expressly incorporated herein by reference.

TECHNICAL FIELD

Embodiments of the present application relate to the field of communications technologies, and in particular, to an electronic device and a focusing method.

BACKGROUND

Generally, when a user performs photographing by using an electronic device, the electronic device may perform focusing in a Phase Difference Auto Focus (PDAF) manner to obtain clearer pictures. Specifically, the electronic device may obtain a phase difference (PD) through calculation by using a PD point pair provided on a sensor, and convert the phase difference into a moving distance of a motor in a lens module, so that the electronic device can determine a focus point based on the moving distance, to implement focusing.

However, the arrangement of PD point pairs in the electronic device is fixed. In the foregoing method, the electronic device may not accurately obtain a phase difference of some areas, and therefore accuracy of performing focusing by the electronic device is relatively low.

SUMMARY

According to a first aspect of the embodiments of the present application, an electronic device is provided. The electronic device includes at least two cameras, and each of the at least two cameras is provided with a PD point pair set including one or more PD point pairs. The one or more PD point pairs in the PD point pair set of one camera are located in different areas of the one camera, and areas of another camera corresponding to the different areas in where the one or more PD point pairs set on the one camera are located do not have PD point pairs located therein, where the another camera is a camera other than the one camera in the at least two cameras.

According to a second aspect of the embodiments of the present application, a focusing method is provided, applied to an electronic device. The electronic device includes at least two cameras, wherein each of the at least two cameras is provided with a PD point pair set including one or more PD point pairs, and the focusing method includes: obtaining at least two target parameters, where each target parameter is a phase parameter obtained by using a PD point pair set on one camera; and the one or more PD point pairs in the PD point pair set of one camera are located in different areas of the one camera, and areas of another camera corresponding to the different areas where the one or more PD point pairs set on the one camera are located do not have PD point pairs located therein, wherein the another camera is a camera other than the one camera in the at least two cameras; determining at least two target phase differences based on the at least two target parameters, where each target phase difference is a phase difference in an area corresponding to one camera; and controlling, based on the at least two target phase differences, the at least two cameras to focus separately.

According to a third aspect of the embodiments of the present application, an electronic device is provided. The electronic device includes at least two cameras, wherein each of the at least two cameras is provided with a PD point pair set including one or more PD point pairs, and the electronic device includes an obtaining module, a determining module, and a control module. The obtaining module is configured to obtain at least two target parameters, where each target parameter is a phase parameter obtained by using a PD point pair set on one camera; and the one or more PD point pairs in the PD point pair set of one camera are located in different areas of the one camera, and areas of another camera corresponding tare located do not have PD point pairs located therein, wherein the another camera is a camera other than the one camera in the at least two cameras. The determining module is configured to determine at least two target phase differences based on the at least two target parameters obtained by the obtaining module, where each target phase difference is a phase difference in an area corresponding to one camera. The control module is configured to control, based on the at least two target phase differences determined by the determining module, the at least two cameras to focus separately.

According to a fourth aspect of the embodiments of the present application, an electronic device is provided. The electronic device includes a processor, a memory, and a computer program that is stored in the memory and that be run by the processor, and when the computer program is executed by the processor, the steps of the focusing method in the second aspect are implemented.

According to a fifth aspect of the embodiments of the present application, a computer-readable storage medium is provided. The computer-readable storage medium stores a computer program, and when the computer program is executed by a processor, the steps of the focusing method in the second aspect are implemented.

DETAILED DESCRIPTION

Figure 1:
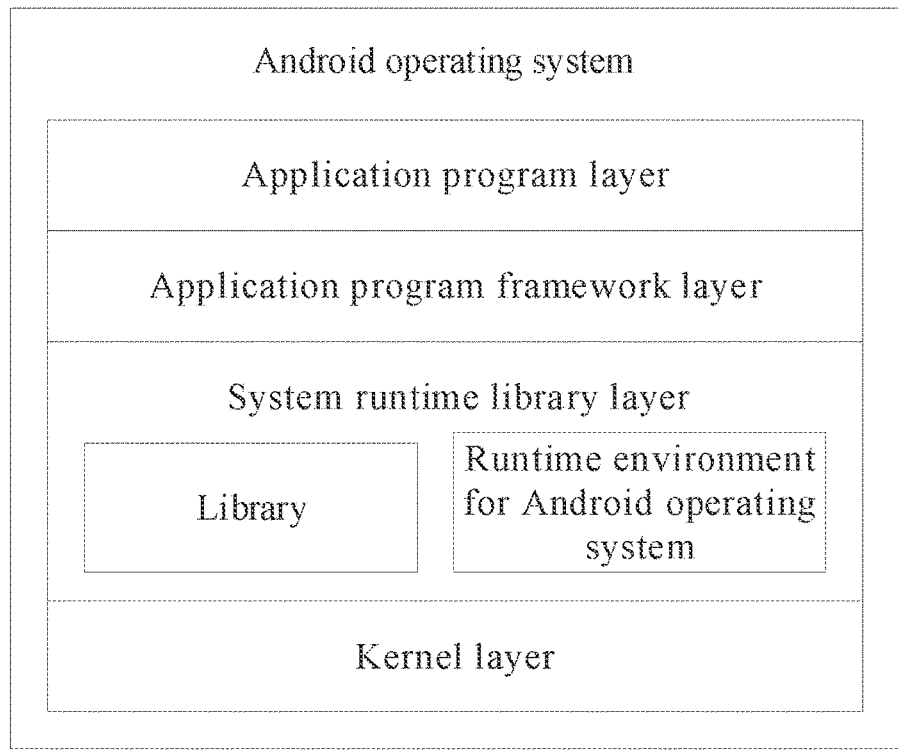
FIG. 1 is a schematic architectural diagram of an Android operating system according to an embodiment of the present application.

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

In the specification and claims in the embodiments of the present application, the terms "first", "second", and the like are intended to distinguish between different objects but do not describe a particular order of the objects. For example, a first camera, a second camera, and the like are intended to distinguish between different cameras, instead of describing a particular order of the cameras.

In the descriptions in the embodiments of the present application, unless otherwise provided, "a plurality of" means two or more than two. For example, a plurality of elements mean two or more elements.

In this specification, a term "and/or" is only an associative relationship for describing associated objects, indicating that three relationships may exist, for example, a display panel and/or backlight, which may indicate three situations: the display panel exists independently; the display panel and the backlight exist simultaneously; and the backlight exists independently. In this specification, a symbol "/" represents a relationship or between associated object, for example, an input/output represents an input or an output.

In the embodiments of the present application, the word "exemplarily" or "example" is used as an example, illustration, or description. Any embodiment or design scheme described as "exemplarily" or an "example" in the embodiments of the present application should not be explained as being more preferred or having more advantages than another embodiment or design scheme. Exactly, the use of the term "example" or "for example" is intended to present a concept in a specific manner.

The embodiments of the present application provide an electronic device and a focusing method. The electronic device may include at least two cameras, wherein each of the at least two cameras is provided with a PD point pair set including one or more PD point pairs. The one or more PD point pairs in the PD point pair set of one camera are located in different areas of the one camera, and areas of another camera corresponding to the different areas where the one or more PD point pairs set on the one camera are located do not have PD point pairs located therein. Because the one or more PD point pairs in the PD point pair set of one camera are located in different areas of the one camera, and areas of another camera corresponding the different areas where the one or more PD point pairs set on the one camera are located do not have PD point pairs located therein, the electronic device may determine a phase difference between respective corresponding areas by using the at least two cameras, to accurately determine a zooming location based on the determined phase difference, thereby improving the accuracy of performing focusing by the electronic device.

The electronic device and the focusing method provided in the embodiments of the present application may be applied to a process in which the electronic device performs focusing on a camera.

The electronic device in the embodiments of the present application may be an electronic device with an operating system. The operating system may be an Android operating system, an iOS operating system, or another possible operating system. This is not specifically limited in the embodiments of the present application.

The following uses the Android operating system as an example to describe a software environment to which the focusing method provided in the embodiments of the present application is applied.

As shown in FIG. 1, FIG. 1 is a schematic architectural diagram of a possible Android operating system according to an embodiment of the present application. In FIG. 1, an architecture of the Android operating system includes four layers: an application program layer, an application program framework layer, a system runtime library layer, and a kernel layer (which may be specifically a Linux kernel layer).

The application program layer includes all application programs in the Android operating system (including a system application program and a third-party application program).

The application program framework layer is an application program framework, and the developer may develop some application programs based on the application program framework layer when following a development rule of the application program framework.

The system runtime library layer includes a library (also referred to as a system library) and an Android operating system runtime environment. The library mainly provides the Android operating system with various resources required by the Android operating system. The Android operating system runtime environment is used to provide the Android operating system with a software environment.

The kernel layer is an operating system layer of the Android operating system, and is the bottom-most layer in the Android operating system software layers. The kernel layer provides the Android operating system with a core system service and a hardware-related driver based on the Linux kernel.

The Android operating system is used as an example. In the embodiments of the present application, a developer may develop, based on the system architecture of the Android operating system shown in FIG. 1, a software program to implement the focusing method provided in the embodiments of the present application, so that the focusing method can run based on the Android operating system shown in FIG. 1. That is, a processor or an electronic device may run the software program in the Android operating system to implement the focusing method provided in the embodiments of the present application.

The electronic device in the embodiments of the present application may be a mobile electronic device, or may be a non-mobile electronic device. For example, the mobile electronic device may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile electronic device may be a personal computer (PC), a television (TV), an automated teller machine, or a self-service machine. This is not specifically limited in the embodiments of the present application.

With reference to the accompanying drawings, the following describes in detail, based on specific embodiments and application scenarios thereof, an electronic device and a focusing method provided in the embodiments of the present application.

An embodiment of the present application provides an electronic device. The electronic device includes at least two cameras, and each of the at least two cameras is provided with a PD point pair set.

In this embodiment of the present application, for each of the at least two cameras, the one or more PD point pairs in the PD point pair set of one camera are located in different areas of the one camera, areas of another camera corresponding to the different areas where the one or more PD point pairs set on the one camera are located do not have PD point pairs located therein, wherein the another camera is a camera other than the one camera in the at least two cameras.

In this embodiment of the present application, the PD point pair set may include at least two PD point pairs.

It should be noted that a PD point pair may be understood as a special pixel used to detect a phase on a sensor of a camera, which generally appears in pairs. A PD sensor is a camera with a PD point pair.

In this embodiment of the present application, the at least two cameras include a first camera and a second camera, the first camera is provided with a first PD point pair set, and the second camera is provided with a second PD point pair set. Each PD point pair in the first PD point pair set is located in one first area on the first camera, each PD point pair in the second PD point pair set is located in one second area on the second camera, an area corresponding to each second area on the first camera does not include a PD point pair, and an area corresponding to each first area on the second camera does not include a PD point pair.

It should be noted that a PD point pair set is specifically described in the following embodiment, and details are not described herein.

An embodiment of the present application provides an electronic device. The electronic device may include at least two cameras, and each of the at least two cameras is provided with a PD point pair set including one or more PD point pairs. The one or more PD point pairs in the PD point pair set of one camera are located in different areas of the one camera, and areas of another camera corresponding to the different areas where the one or more PD point pairs set on the one camera are located do not have PD point pairs located therein. Because the one or more PD point pairs in the PD point pair set of one camera are located in different areas of the one camera, and areas of another camera corresponding to the different areas where the one or more PD point pairs set on the one camera are located do not have PD point pairs located therein, the electronic device may determine a phase difference between respective corresponding areas by using the at least two cameras, to accurately determine a zooming location based on the determined phase difference, thereby improving the accuracy of performing focusing by the electronic device.

Figure 2:
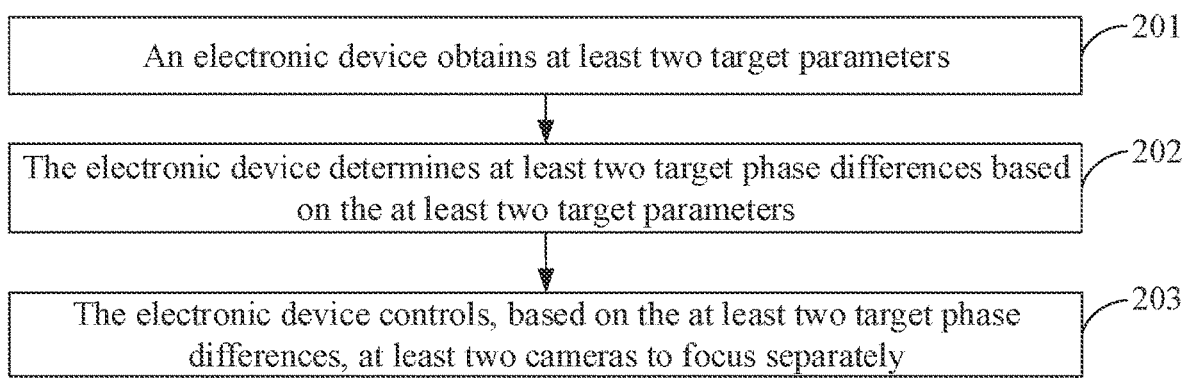
FIG. 2 is a first schematic diagram of a focusing method according to an embodiment of the present application.

An embodiment of the present application provides a focusing method. FIG. 2 is a flowchart of a focusing method according to an embodiment of the present application. The method may be applied to an electronic device having the Android operating system shown in FIG. 1. As shown in FIG. 2, the focusing method provided in this embodiment of the present application may include the following step 201 to step 203.

Step 201: The electronic device obtains at least two target parameters.

In this embodiment of the present application, the electronic device may include at least two cameras, and each of the at least two cameras is provided with a PD point pair set.

In this embodiment of the present application, each of the at least two target parameters is a phase parameter obtained by using a PD point pair set including one or more PD point pairs on one camera. The one or more PD point pairs in the PD point pair set of one camera are located in different areas of the one camera, and areas of another camera corresponding to the different areas where the one or more PD point pairs set on the one camera are located do not have PD point pairs located therein, and the another camera is a camera other than the one camera in the at least two cameras.

In this embodiment of the present application, for each camera, a PD point pair set on one camera is located in a focusing area corresponding to the one camera.

In this embodiment of the present application, the at least two cameras may include a first camera and a second camera, the first camera is provided with a first PD point pair set, and the second camera is provided with a second PD point pair set; and each first PD point pair in the first PD point pair set is located in one first area on the first camera, each second PD point pair in the second PD point pair set is located in one second area on the second camera, an area corresponding to each second area on the first camera does not include a PD point pair, and an area corresponding to each first area on the second camera does not include a PD point pair.

In this embodiment of the present application, each of the at least two target parameters includes a phase difference and a confidence value.

In this embodiment of the present application, the at least two cameras include a first camera and a second camera, and the at least two target parameters may include a first parameter and a second parameter.

In this embodiment of the present application, the first parameter is a phase parameter when an image is collected by using the first camera, and the second parameter is a phase parameter when an image is collected by using the second camera.

It can be understood that when a user triggers the electronic device to be in a photographing mode, the electronic device may obtain a phase parameter of a to-be-collected image by using the first camera, and obtain a phase parameter of a to-be-collected image by using the second camera.

In this embodiment of the present application, the electronic device may obtain the first parameter by using at least two first PD point pairs on the first camera, and obtain the second parameter by using at least two second PD point pairs on the second camera.

In this embodiment of the present application, the at least two first PD point pairs are located in a first focusing area, and the at least two second PD point pairs are located in a second focusing area. The first focusing area is a focusing area of the first camera (a sensor of the first camera), and the second focusing area is a focusing area of the second camera (a sensor of the second camera). Each first PD point pair is located in one first area in the first focusing area, each second PD point pair is located in one second area in the second focusing area, an area corresponding to each second area in the first focusing area does not include a PD point pair, and an area corresponding to each first area in the second focusing area does not include a PD point pair.

It can be understood that PD point pairs on cameras (the first camera and the second camera) are distributed evenly and cover more image areas, that is, PD point pairs on the first camera are distributed in an edge area (or a central area) of an image area, and PD point pairs on the second camera are distributed in a central area (or an edge area). In this way, all PD point pairs may cover the entire image area.

It should be noted that a relationship between a location of the first camera and a location of the second camera is not limited in this embodiment of the present application. For example, the first camera and the second camera may be placed in parallel.

Figure 3:
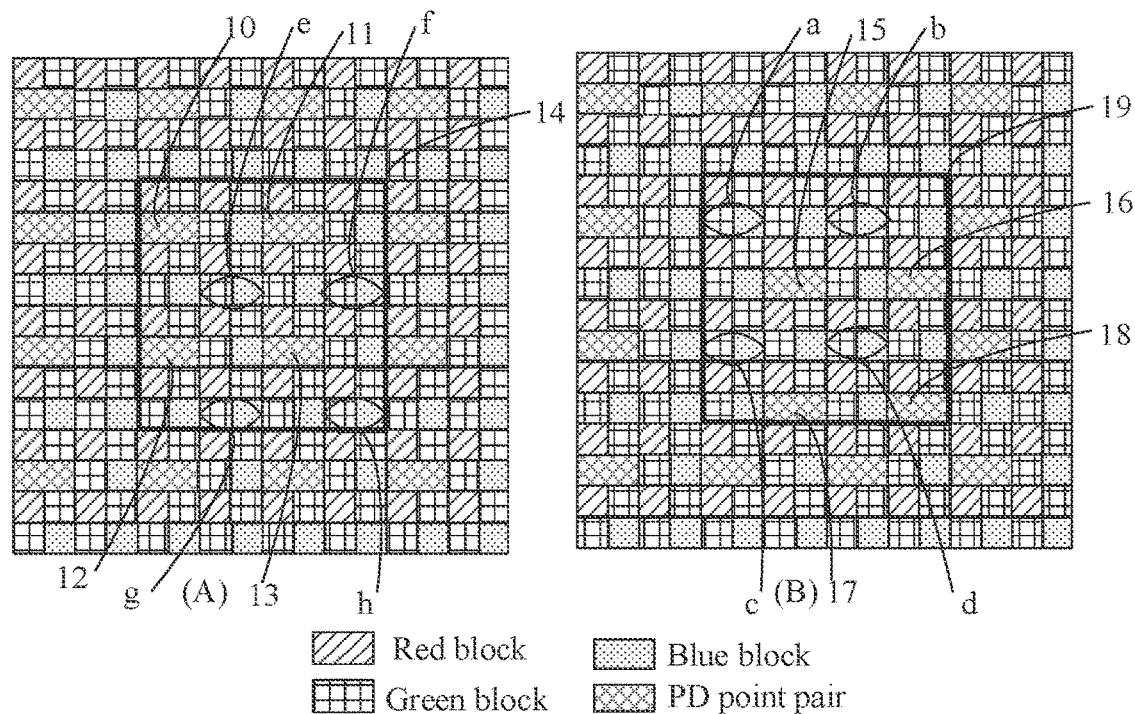
FIG. 3 is a schematic diagram of arrangement and distribution of PD point pairs according to an embodiment of the present application.

For example, as shown in (A) in FIG. 3, an image area corresponding to the first camera includes a plurality of PD point pairs (for example, a PD point pair 10, a PD point pair 11, a PD point pair 12, and a PD point pair 13) and a plurality of other color blocks (a color block that is provided with no PD point pair, that is, a color block of a normal pixel), and the plurality of PD point pairs are located in a first focusing area 14 (ROI). As shown in (B) in FIG. 3, an image area corresponding to the second camera includes a plurality of PD point pairs (for example, a PD point pair 15, a PD point pair 16, a PD point pair 17, and a PD point pair 18) and a plurality of other color blocks (a color block that is provided with no PD point pair, that is, a color block of a normal pixel), and the plurality of PD point pairs are located in a second focusing area 19.

In (A) and (B) in FIG. 3, areas in the first focusing area 14 corresponding to the plurality of PD point pairs in the second focusing area 19 do not include a PD point pair, and areas in the second focusing area 19 corresponding to the plurality of PD point pairs in the first focusing area 14 do not include a PD point pair.

It can be understood that the plurality of PD point pairs on the first camera and the plurality of PD point pairs on the second camera are staggered and evenly arranged. In addition, the plurality of PD point pairs on the first camera and the plurality of PD point pairs on the second camera are located in respective focusing areas, that is, the distribution density of PD point pairs is increased, and focusing accuracy of the PD point pairs is also improved.

In this embodiment of the present application, the first parameter may include a first phase difference and a first confidence value corresponding to the first phase difference, and the second parameter may include a second phase difference and a second confidence value corresponding to the second phase difference.

It can be understood that the first phase difference is an actual output phase difference of the first camera, and the second phase difference is an actual output phase difference of the second camera. The first confidence value is an actual output confidence value of the first camera, the first confidence value is used to indicate the confidence of the first phase difference, the second confidence value is an actual output confidence value of the second camera, and the second confidence value is used to indicate the confidence of the second phase difference.

In this embodiment of the present application, a focusing area of each of the at least two cameras includes a plurality of PD point pairs. The electronic device may obtain a plurality of target parameters by using the plurality of PD point pairs in the respective focusing area, to improve the accuracy of determining a zooming location (or a focusing position) by the electronic device.

In this embodiment of the present application, a focusing area of each of the first camera and the second camera includes a plurality of PD point pairs. The electronic device may obtain the first parameter and the second parameter by using the plurality of PD point pairs in the respective focusing area, to improve the accuracy of determining a zooming location (or a focusing position) by the electronic device.

It should be noted that the foregoing used staggered and uniform arrangement manner is only one of PD point pair arrangement manners, or another arrangement manner may be used to arrange PD point pair, to achieve a same effect.

Step 202: The electronic device determines at least two target phase differences based on the at least two target parameters.

In this embodiment of the present application, each of the at least two target phase differences is a phase difference in an area corresponding to one camera.

Figure 4:
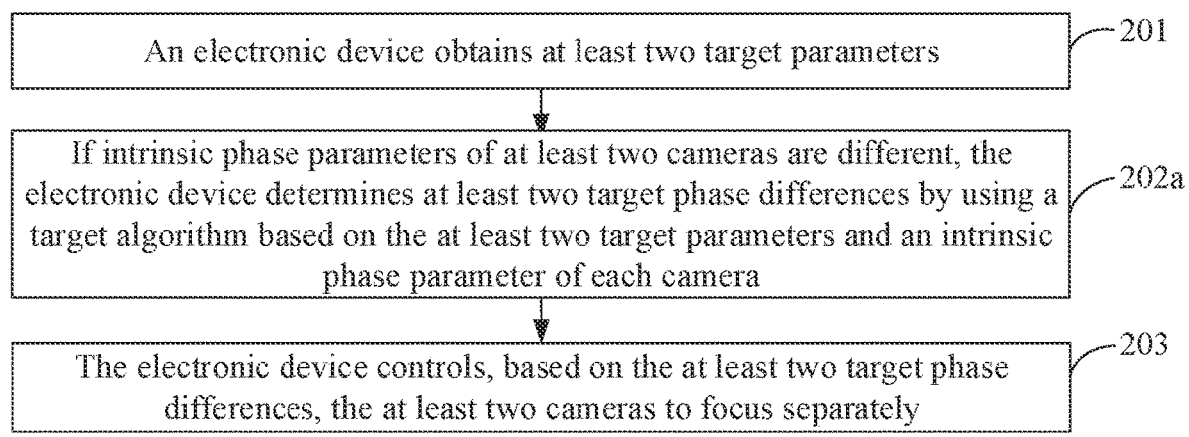
FIG. 4 is a second schematic diagram of a focusing method according to an embodiment of the present application.

In this embodiment of the present application, with reference to FIG. 2, as shown in FIG. 4, step 202 may be specifically implemented by using the following step 202a.

Step 202a: If intrinsic phase parameters of the at least two cameras are different, the electronic device determines the at least two target phase differences by using a target algorithm based on the at least two target parameters and an intrinsic phase parameter of each camera.

In this embodiment of the present application, each intrinsic phase parameter may include an intrinsic phase difference and an intrinsic confidence value.

It should be noted that, that the intrinsic phase parameters of the at least two cameras are different may be understood as: a value range of the intrinsic phase difference of each camera is different, and a value range of the intrinsic confidence value of each camera is different.

In this embodiment of the present application, if the at least two cameras include a first camera and a second camera, the electronic device may determine a target phase difference corresponding to the first camera and a target phase difference corresponding to the second camera based on the first parameter and the second parameter.

It can be understood that the electronic device may calculate a phase difference in a focusing area corresponding to each camera based on the first parameter and the second parameter by using a PD point pair.

It should be noted that each target phase difference is a zooming phase difference corresponding to one camera.

In this embodiment of the present application, in a case that a first intrinsic phase parameter of the first camera is different from a second intrinsic phase parameter of the second camera, the electronic device may determine the target phase difference corresponding to the first camera and the target phase difference corresponding to the second camera by using the target algorithm based on the first intrinsic phase parameter, the second intrinsic phase parameter, the first parameter, and the second parameter.

It should be noted that, that the first intrinsic phase parameter of the first camera is different from the second intrinsic phase parameter of the second camera may be understood as follows: a value range of a first intrinsic phase difference is different from a value range of a second intrinsic phase difference, and a value range of a first intrinsic confidence value is different from a value range of a second intrinsic confidence value.

In this embodiment of the present application, the electronic device may map the first parameter to the second camera, or map the second parameter to the first camera, to calculate a phase difference corresponding to the first camera or a phase difference corresponding to the second camera.

In this embodiment of the present application, a last zooming location may be calculated by using the two values based on an obtained phase difference (denoted by F) and obtained confidence (denoted by C). In this example, a sensor A and a sensor B calculate the phase difference F and the confidence C by using respective four PD point pairs.

In this embodiment of the present application, the value range of the first intrinsic phase difference may be [F10, F11], the value range of the first intrinsic confidence value may be [C10, C11], the value range of the second intrinsic phase difference may be [F20, F21], and the value range of the second intrinsic confidence value may be [C20, C21].

For example, the first camera is used as an example for description, and the first parameter may be mapped to the second camera. The target algorithm may be F1"=$F_b \times$(F11−F10)/(F21−F20), where F1" is the target phase difference corresponding to the first camera, and $F_b$, is the target phase difference corresponding to the second camera.

$F_b=(F1'\times C1'+F2\times C2)/(C1'+C2)$, where F1' is a phase difference obtained by mapping the first phase difference to the second camera, C1' is a confidence value obtained by mapping the first confidence value to the second camera, F2 is the second phase difference, and C2 is the second confidence value.

$F1'=F1\times(F21-F20)/(F11-F10)$, and $C1'=C1\times(C21-C20)/(C11-C10)$, where F1 is the first phase difference, and C1 is the first confidence value.

Step 203: The electronic device controls, based on the at least two target phase differences, at least two cameras to focus separately.

In this embodiment of the present application, the electronic device may first determine a zooming location (that is, a focusing position) of each of the at least two cameras based on the at least two target phase differences, and then separately control, based on each zooming location, a corresponding camera to focus (that is, perform focusing on a location in a to-be-photographed image or a preview interface).

In this embodiment of the present application, the electronic device may obtain a zooming location of the first camera or a zooming location of the second camera through a calculation based on the target phase difference $F_a$.

In this embodiment of the present application, the electronic device may obtain a zooming location of the first camera through a calculation based on the target phase difference F1", and the electronic device may obtain a zooming location of the second camera through a calculation based on the target phase difference $F_b$.

In this embodiment of the present application, the electronic device may calculate a phase difference by using one or more PD point pairs, and then convert the phase difference into a moving distance of a motor, to determine a zooming location.

An embodiment of the present application provides a focusing method. An electronic device may determine at least two target phase differences (each target phase difference is a phase difference on an area corresponding to one camera) based on at least two obtained target parameters, and control, based on the at least two target phase differences, at least two cameras to separately focus. Because one or more PD point pairs in the PD point pair set of one camera are located in different areas of the one camera, and areas of another camera corresponding to the different areas where the one or more PD point pairs set on the one camera are located do not have PD point pairs located therein, the electronic device may determine a phase difference between respective corresponding areas by using the at least two cameras, to accurately determine a zooming location based on the determined phase difference, thereby improving the accuracy of performing focusing by the electronic device.

In this embodiment of the present application, two cameras are used to perform focusing, and PD point pairs in focusing areas of two cameras need to be evenly arranged. Therefore, the accuracy of phase difference output can be improved, and a focusing success rate is improved without loss of image quality.

Figure 5:
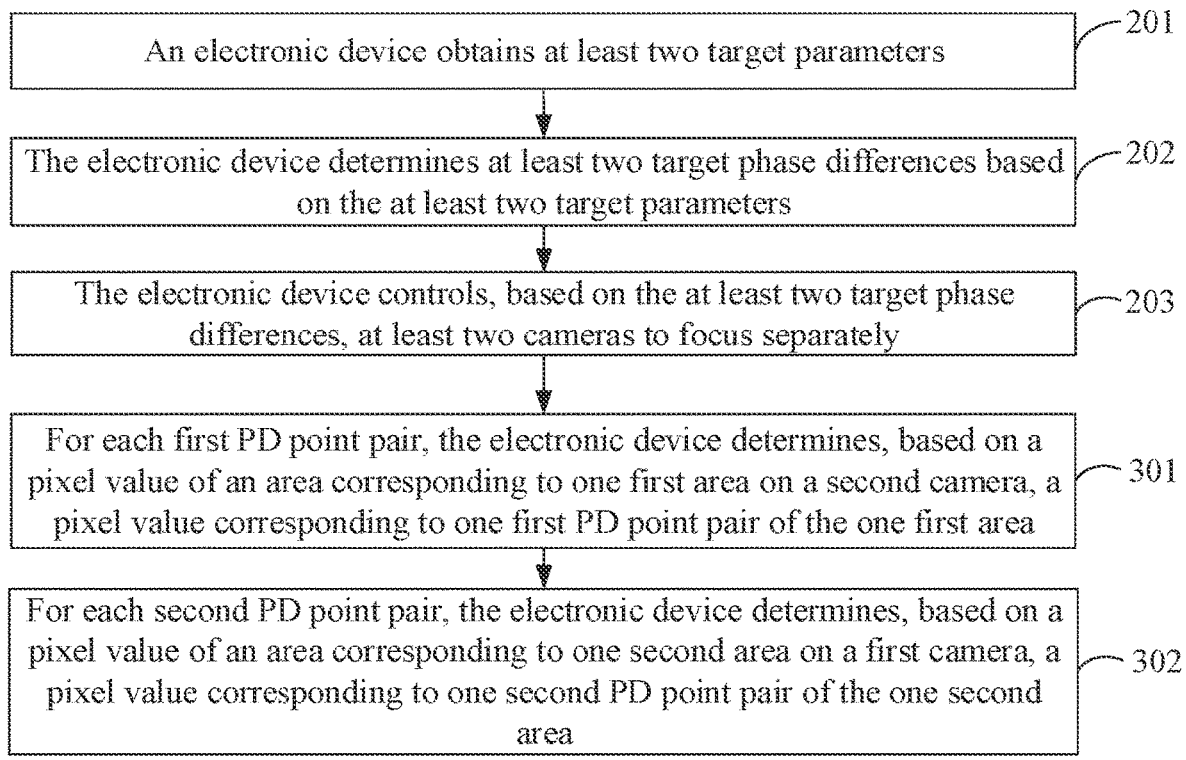
FIG. 5 is a third schematic diagram of a focusing method according to an embodiment of the present application.

In this embodiment of the present application, with reference to FIG. 2, as shown in FIG. 5, after step 203, the focusing method provided in this embodiment of the present application may further include the following step 301 and step 302 for implementation.

Step 301: For each first PD point pair, the electronic device determines, based on a pixel value of an area corresponding to one first area on the second camera, a pixel value corresponding to one first PD point pair of the one first area.

Step 302: For each second PD point pair, the electronic device determines, based on a pixel value of an area corresponding to one second area on the first camera, a pixel value corresponding to one second PD point pair of the one second area.

It can be understood that, when an image is generated, in a dead pixel processing process of an image signal processor (ISP), a pixel in a location corresponding to the second camera is used to estimate a corresponding pixel value of a PD point pair of the first camera, and a pixel in a location corresponding to the first camera is used to estimate a corresponding pixel value of a PD point pair of the second camera.

In this embodiment of the present application, the electronic device may determine a pixel value of an area corresponding to one first area in the second focusing area as a pixel value corresponding to one first PD point pair of the one first area, or the electronic device may obtain, through calculation by using a preset algorithm based on a pixel value of an area corresponding to one first area in the second focusing area, a pixel value corresponding to one first PD point pair of the one first area.

In this embodiment of the present application, the electronic device may determine a pixel value of an area corresponding to one second area in the first focusing area as a pixel value corresponding to one second PD point pair of the one second area, or the electronic device may obtain, through calculation by using a preset algorithm based on a pixel value of an area corresponding to one second area in the first focusing area, a pixel value corresponding to one second PD point pair of the one second area.

For example, as shown in (A) and (B) in FIG. 3, areas corresponding to all first areas in the second focusing area 19 (an area in which the PD point pair 10 is located, an area in which the PD point pair 11 is located, an area in which the PD point pair 12 is located, and an area in which the PD point pair 13 is located) are an area a, an area b, an area c, and an area d; areas corresponding to all second areas in the first focusing area 14 (an area in which the PD point pair 15 is located, an area in which the PD point pair 16 is located, an area in which the PD point pair 17 is located, and an area in which the PD point pair 18 is located) are an area e, an area f, an area g, and an area h. The electronic device may determine, based on a pixel value of the area a, a pixel value of an area in which the PD point pair 10 is located, determine, based on a pixel value of the area b, a pixel value of an area in which the PD point pair 11 is located, determine, based on a pixel value of the area c, a pixel value of an area in which the PD point pair 12 is located, and determine, based on a pixel value of the area d, a pixel value of an area in which the PD point pair 13 is located. The electronic device may determine, based on a pixel value of the area e, a pixel value of an area in which the PD point pair 15 is located, determine, based on a pixel value of the area f, a pixel value of an area in which the PD point pair 16 is located, determine, based on a pixel value of the area g, a pixel value of an area in which the PD point pair 17 is located, and determine, based on a pixel value of the area h, a pixel value of an area in which the PD point pair 18 is located.

In this embodiment of the present application, due to staggered arrangement, a pixel value of a PD point pair of a camera may be replaced by a pixel value in a location corresponding to another camera, thereby improving the accuracy of an actual pixel value of a PD point pair, and improving imaging quality. In addition, in a case that total quantities of PD point pairs are the same, a plurality of cameras are used for sharing, PD point pairs on a single camera are less, and image quality is higher.

In this embodiment of the present application, focusing and imaging are performed by using a combination of a plurality of cameras, and a specific PD point pair arrangement manner may be met between the cameras, to obtain a higher-quality imaging image with a more accurate focusing effect.

Figure 6:
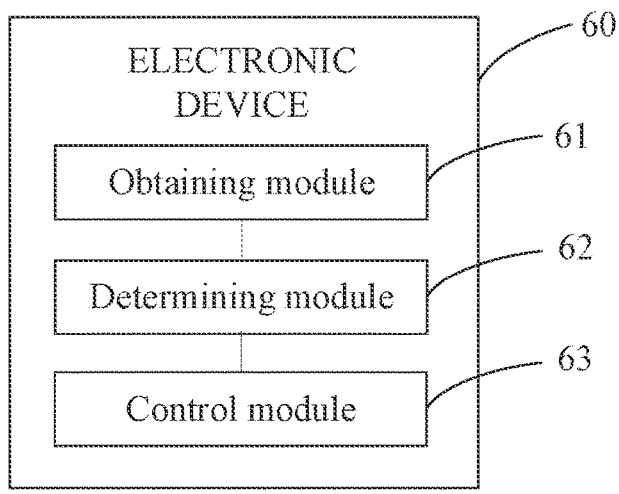
FIG. 6 is a schematic structural diagram of an electronic device according to an embodiment of the present application.

FIG. 6 is a possible schematic structural diagram of an electronic device according to an embodiment of the present application. The electronic device includes at least two cameras, and each of the at least two cameras is provided with a PD point pair set. As shown in FIG. 6, an electronic device 60 may include an obtaining module 61, a determining module 62, and a control module 63.

The obtaining module 61 is configured to obtain at least two target parameters, where each target parameter is a phase parameter obtained by using one or more PD point pairs set on one camera; and the one or more PD point pairs in the PD point pair set of one camera are located in different areas of the one camera, and areas of another camera corresponding to the different areas where the one or more PD point pair set on the one camera are located do not have PD point pairs located therein, and the another camera is a camera other than the one camera in the at least two cameras. The determining module 62 is configured to determine at least two target phase differences based on the at least two target parameters obtained by the obtaining module 61, where each target phase difference is a phase difference in an area corresponding to one camera. The control module 63 is configured to control, based on the at least two target phase differences determined by the determining module 62, the at least two cameras to focus separately.

In a possible implementation, the at least two cameras include a first camera and a second camera, the first camera is provided with a first PD point pair set, and the second camera is provided with a second PD point pair set; and each first PD point pair in the first PD point pair set is located in one first area on the first camera, each second PD point pair in the second PD point pair set is located in one second area on the second camera, an area corresponding to each second area on the first camera does not include a PD point pair, and an area corresponding to each first area on the second camera does not include a PD point pair. Each of the at least two target parameters includes a phase difference and a confidence value.

In a possible implementation, the determining module 62 is further configured to: for each first PD point pair, determine, based on a pixel value of an area corresponding to one first area on the second camera, a pixel value corresponding to one first PD point pair of the one first area; and for each second PD point pair, determine, based on a pixel value of an area corresponding to one second area on the first camera, a pixel value corresponding to one second PD point pair of the one second area.

In a possible implementation, the determining module 62 is specifically configured to: if intrinsic phase parameters of the at least two cameras are different, determine the at least two target phase differences by using a target algorithm based on the at least two target parameters and an intrinsic phase parameter of each camera.

The electronic device provided in this embodiment of the present application can implement the processes implemented by the electronic device in the forgoing method embodiment. To avoid repetition, details are not described herein again.

An embodiment of the present application provides an electronic device. The electronic device may include at least two cameras, and each of the at least two cameras is provided with a PD point pair set including one or more PD point pairs. The one or more PD point pairs in the PD point pair set of one camera are located in different areas of the one camera, and areas of another camera corresponding to the different areas where the one or more PD point pairs set on the one camera are located do not have PD point pairs located therein. Because the one or more PD point pairs in the PD point pair set of one camera are located in different areas of the one camera, and areas of another camera corresponding to the different areas where the one or more PD point pairs set on the one camera are located do not have PD point pairs located therein, the electronic device may determine a phase difference between respective corresponding areas by using the at least two cameras, to accurately determine a zooming location based on the determined phase difference, thereby improving the accuracy of performing focusing by the electronic device.

Figure 7:
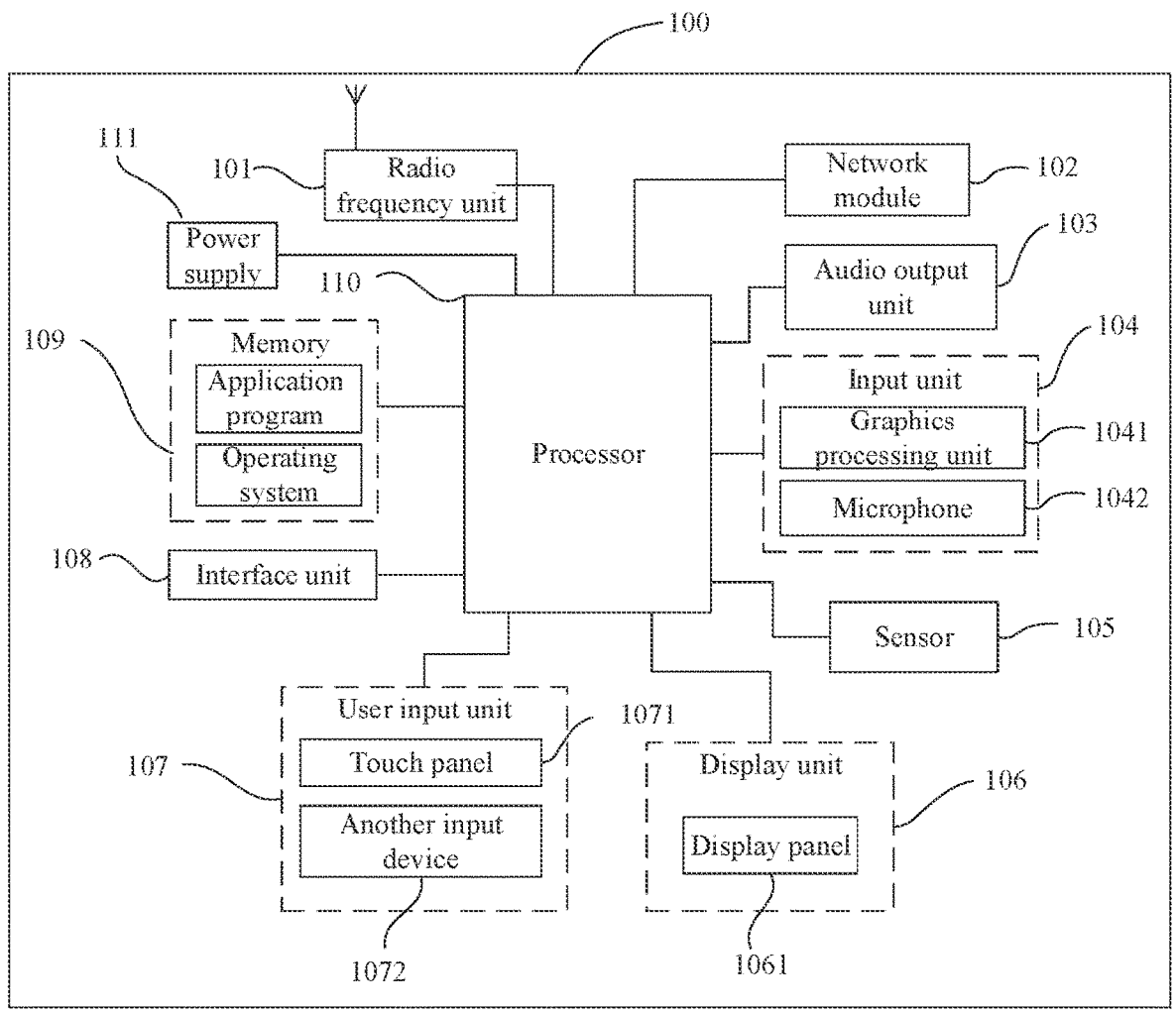
FIG. 7 is a schematic diagram of hardware of an electronic device according to an embodiment of the present application.

FIG. 7 is a schematic diagram of hardware of an electronic device according to the embodiments of the present application. As shown in FIG. 7, an electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111.

It should be noted that a person skilled in the art may understand that a structure of the electronic device shown in FIG. 7 constitutes no limitation on the electronic device, and the electronic device may include more or fewer components than those shown in FIG. 7, or have a combination of some components, or have a different component arrangement. In this embodiment of the present application, the electronic device includes but is not limited to a mobile phone, a tablet computer, a notebook computer, a palmtop computer, an in-vehicle terminal, a wearable device, a pedometer, and the like.

The processor 110 is configured to: obtain at least two target parameters, where each target parameter is a phase parameter obtained by using one or more PD point pairs set on one camera; and the one or more PD point pairs in the PD point pair set of one camera are located in different areas of the one camera, and areas of another camera corresponding to the different areas where the one or more PD point pairs set on the one camera are located donot have PD point pairs located therein, and the another camera is a camera other than the one camera in the at least two cameras; determine at least two target phase differences based on the at least two target parameters obtained by the obtaining module, where each target phase difference is a phase difference in an area corresponding to one camera; and control, based on the at least two target phase differences determined by the determining module, the at least two cameras to focus separately.

An embodiment of the present application provides an electronic device. The electronic device may determine at least two target phase differences (each target phase difference is a phase difference on an area corresponding to one camera) based on at least two obtained target parameters, and control, based on the at least two target phase differences, at least two cameras to separately focus. Because one or more PD point pairs in the PD point pair set of one camera are located in different areas of the one camera, and areas of another camera corresponding to the different areas where the one or more PD point pairs set on the one camera are located do not have PD point pairs located therein, the electronic device may determine a phase difference between respective corresponding areas by using the at least two cameras, to accurately determine a zooming location based on the determined phase difference, thereby improving accuracy of performing focusing by the electronic device.

It should be understood that, in this embodiment of the present application, the radio frequency unit 101 may be configured to receive and send information or a signal in a call process. Specifically, after receiving downlink data from a base station, the radio frequency unit 101 sends the downlink data to the processor 110 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The electronic device provides wireless broadband Internet access for the user by using the network module 102, for example, helping the user to send and receive an e-mail, brows a web page, and access streaming media.

The audio output unit 103 may convert audio data received by the radio frequency unit 101 or the network module 102 or stored in the memory 109 into an audio signal and output the audio signal as a sound. In addition, the audio output unit 103 may further provide an audio output (for example, a call signal received voice, or a message received voice) related to a specific function implemented by the electronic device 100. The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042, and the graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The electronic device 100 further includes at least one sensor 105 such as a light sensor, a motion sensor, and another sensor. Specifically, the light sensor includes an ambient light sensor and a proximity sensor. The ambient light sensor may adjust the luminance of the display panel 1061 based on the brightness of ambient light. The proximity sensor may turn off the display panel 1061 and/or backlight when the electronic device 100 moves to an ear. As a type of the motion sensor, an accelerometer sensor may detect an acceleration value in each focus area (generally, three axes), and detect a value of gravity and a focus area when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061. The display panel 1061 may be configured in a form of a liquid crystal display (LCD), an organic light-emitting diode (OLED), or the like.

The user input unit 107 may be configured to: receive entered digital or character information, and generate key signal input related to a user setting and function control of the electronic device. Specifically, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 110, and can receive and execute a command sent by the processor 110. In addition, the touch panel 1071 may be of a resistive type, a capacitive type, an infrared type, a surface acoustic wave type, or the like. The user input unit 107 may include another input device 1072 in addition to the touch panel 1071. Specifically, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting the touch operation on or near the touch panel 1071, the touch panel 1071 transmits the touch operation to the processor 110 to determine a type of a touch event, and then the processor 110 provides a corresponding visual output on the display panel 1061 based on the type of the touch event. In FIG. 7, although the touch panel 1071 and the display panel 1061 are used as two independent parts to implement input and output functions of the electronic device, in some embodiments, the touch panel 1071 and the display panel 1061 may be integrated to implement the input and output functions of the electronic device. This is not specifically limited herein.

The interface unit 108 is an interface for connecting an external apparatus with the electronic device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 108 may be configured to receive input (for example, data information and power) from an external apparatus and transmit the received input to one or more elements in the electronic device 100 or may be configured to transmit data between the electronic device 100 and an external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage device, a flash storage device, or another volatile solid-state storage device.

The processor 110 is a control center of the electronic device, connects all parts of the entire electronic device by using various interfaces and lines, and performs various functions of the electronic device and data processing by running or executing a software program and/or a module that are/is stored in the memory 109 and by invoking data stored in the memory 109, to overall monitor the electronic device. The processor 110 may include one or more processing units. An application processor and a modem processor may be integrated into the processor 110. The application processor mainly processes an operating system, a user interface, an application program, and the like. The modem processor mainly processes wireless communications. It can be understood that, alternatively, the modem processor may not be integrated into the processor 110.

The electronic device 100 may further include the power supply 111 (such as a battery) that supplies power to each component. The power supply 111 may be logically connected to the processor 110 by using a power supply management system, so as to implement functions such as charging and discharging management, and power consumption management by using the power supply management system.

In addition, the electronic device 100 includes some function modules not shown, and details are not described herein.

An embodiment of the present application further provides an electronic device, including the processor 110 and the memory 109 shown in FIG. 7, and a computer program that is stored in the memory 109 and that can run by the processor 110. When the computer program is executed by the processor 110, the foregoing processes of the method embodiment are implemented and a same technical effect can be achieved. To avoid repetition, details are not described herein again.

An embodiment of the present application further provides a computer-readable storage medium. The computer-readable storage medium stores a computer program, and when the computer program is executed by a processor, the processes of the foregoing method embodiment are implemented and a same technical effect can be achieved. To avoid repetition, details are not described herein again. The computer-readable storage medium includes a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements intrinsic to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. The technical solutions of the present application essentially or the part contributing to the prior art may be implemented in a form of a software product. The computer software product is stored in a storage medium (such as a ROM/RAM, a hard disk, or an optical disc), and includes several instructions for instructing an electronic device (which may be mobile phone, a computer, a server, an air conditioner, a network device, or the like) to perform the methods described in the embodiments of the present application.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

What is claimed is:

1. An electronic device, comprising at least two cameras having respective intrinsic phase parameters, wherein each of the at least two cameras is provided with a phase difference (PD) point pair set comprising one or more PD point pairs;

wherein the one or more PD point pairs in the PD point pair set of one camera are located in different areas of the one camera, and areas of another camera corresponding to the different areas where the one or more PD point pairs of the one camera are located do not have PD point pairs located therein, wherein the another camera is a camera other than the one camera in the at least two cameras, wherein the at least two cameras are configured to focus based on information obtained using the PD point pair set of each camera and the intrinsic phase parameters of the at least two cameras.

2. The electronic device according to claim 1, wherein:

the at least two cameras comprise a first camera and a second camera, the first camera is provided with a first PD point pair set, and the second camera is provided with a second PD point pair set; and each PD point pair in the first PD point pair set is located in one first area on the first camera, each PD point pair in the second PD point pair set is located in one second area on the second camera, an area corresponding to each second area on the first camera does not comprise a PD point pair, and an area corresponding to each first area on the second camera does not comprise a PD point pair.

3. A focusing method, performed by an electronic device, wherein the electronic device comprises at least two cameras having respective intrinsic phase parameters, each of the at least two cameras is provided with a phase difference (PD) point pair set comprising one or more PD point pairs, and the method comprises:

obtaining at least two target parameters, wherein each target parameter is a phase parameter obtained by using the PD point pair set of one camera, the one or more PD point pairs in the PD point pair set of the one camera are located in different areas of the one camera, and areas of another camera corresponding to the different areas where the one or more PD point pairs of the one camera are located do not have PD point pairs located therein, wherein the another camera is a camera other than the one camera in the at least two cameras;

determining at least two target phase differences based on the at least two target parameters and the intrinsic phase parameters of the at least two cameras, wherein each target phase difference is a phase difference in an area corresponding to one camera; and controlling, based on the at least two target phase differences, the at least two cameras to focus separately.

4. The method according to claim 3, wherein:

the at least two cameras comprise a first camera and a second camera, the first camera is provided with a first PD point pair set, and the second camera is provided with a second PD point pair set;

each first PD point pair in the first PD point pair set is located in one first area on the first camera, each second PD point pair in the second PD point pair set is located in one second area on the second camera, an area corresponding to each second area on the first camera does not comprise a PD point pair, and an area corresponding to each first area on the second camera does not comprise a PD point pair; and each of the at least two target parameters comprises a phase difference and a confidence value.

5. The method according to claim 4, further comprising:

for each first PD point pair, determining, based on a pixel value of an area corresponding to one first area on the second camera, a pixel value corresponding to one first PD point pair of the one first area; and for each second PD point pair, determining, based on a pixel value of an area corresponding to one second area on the first camera, a pixel value corresponding to one second PD point pair of the one second area.

6. The method according to claim 3, wherein the determining at least two target phase differences based on the at least two target parameters comprises:

when the intrinsic phase parameters of the at least two cameras are different, determining the at least two target phase differences by using a target algorithm based on the at least two target parameters and an intrinsic phase parameter of each camera.

7. An electronic device, comprising:

a memory storing a computer program;

at least two cameras having respective intrinsic phase parameters, each of the at least two cameras is provided with a phase difference (PD) point pair set comprising one or more PD point pairs; and a processor coupled to the memory and configured to execute the computer program to perform a method for focusing, the method comprising:

obtaining at least two target parameters, wherein each target parameter is a phase parameter obtained by using the PD point pair set of one camera, the one or more PD point pairs in the PD point pair set of the one camera are located in different areas of the one camera, and areas of another camera corresponding to the different areas where the one or more PD point pairs of the one camera are located do not have PD point pairs located therein, wherein the another camera is a camera other than the one camera in the at least two cameras;

determining at least two target phase differences based on the at least two target parameters and the intrinsic phase parameters of the at least two cameras, wherein each target phase difference is a phase difference in an area corresponding to one camera; and controlling, based on the at least two target phase differences, the at least two cameras to focus separately.

8. The electronic device according to claim 7, wherein:

the at least two cameras comprise a first camera and a second camera, the first camera is provided with a first PD point pair set, and the second camera is provided with a second PD point pair set;

each first PD point pair in the first PD point pair set is located in one first area on the first camera, each second PD point pair in the second PD point pair set is located in one second area on the second camera, an area corresponding to each second area on the first camera does not comprise a PD point pair, and an area corresponding to each first area on the second camera does not comprise a PD point pair; and each of the at least two target parameters comprises a phase difference and a confidence value.

9. The electronic device according to claim 8, further comprising:

for each first PD point pair, determining, based on a pixel value of an area corresponding to one first area on the second camera, a pixel value corresponding to one first PD point pair of the one first area; and for each second PD point pair, determining, based on a pixel value of an area corresponding to one second area on the first camera, a pixel value corresponding to one second PD point pair of the one second area.

10. The electronic device according to claim 7, wherein the determining at least two target phase differences based on the at least two target parameters comprises:

when the intrinsic phase parameters of the at least two cameras are different, determining the at least two target phase differences by using a target algorithm based on the at least two target parameters and an intrinsic phase parameter of each camera.

* * * * *